UNITED STATES PATENT OFFICE.

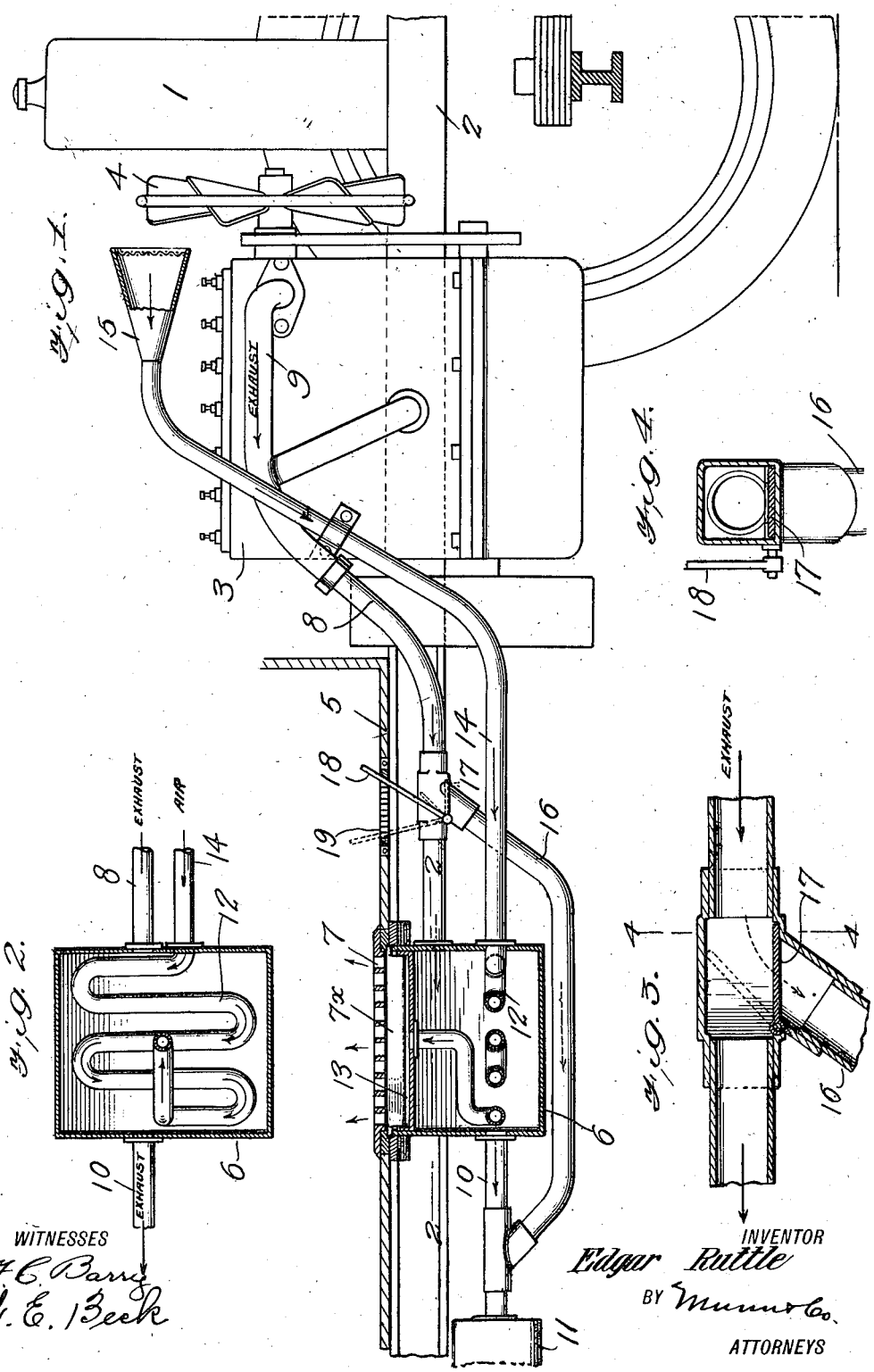

EDGAR RUTTLE, OF COVINGTON, KENTUCKY.

AUTOMOBILE HEATING DEVICE.

1,132,391.          Specification of Letters Patent.      Patented Mar. 16, 1915.

Application filed October 12, 1914. Serial No. 866,329.

*To all whom it may concern:*

Be it known that I, EDGAR RUTTLE, a citizen of the United States, and a resident of Covington, in the county of Kenton and State of Kentucky, have made certain new and useful Improvements in Automobile Heating Devices, of which the following is a specification.

My invention relates to improvements in means for heating automobiles or other similar vehicles, and it consists in the combinations, constructions, and arrangements herein described and claimed.

An object of my invention is to provide a device by means of which an automobile may be heated by the waste products of combustion from the engine.

A further object of my invention is to provide a heating device of the type described in which the pure fresh air is heated, thus dispensing with all obnoxious odors.

A further object of my invention is to provide a heating means which may be regulated so as to heat the vehicle or not as desired.

Other objects and advantages will appear in the following specification and the novel features of the device will be particularly pointed out in the appended claim.

My invention is illustrated in the accompanying drawings forming part of this application in which—

Figure 1 is a side view of the apparatus certain parts being shown in section, Fig. 2 is a section along the line 2—2 of Fig. 1, Fig. 3 is an enlarged section through the by-pass valve, and Fig. 4 is a section along the line 4—4 of Fig. 3.

In carrying out my invention I may make use of an automobile of any ordinary type. The radiator of such an automobile is indicated at 1 and is mounted upon the framework 2 of the vehicle.

At 3 I have shown in general an engine which is provided with a fan 4 disposed immediately behind the radiator.

Underneath the floor 5 of the vehicle I arrange a casing 6 at the top of which is a register 7 in the floor of the vehicle. The casing 6 communicates by means of the exhaust pipe 8 with the exhaust manifold 9. A pipe 10 also establishes communication between the muffler 11 and the opposite side of the casing 6.

Within the casing 6 is a heating coil 12, one end of which discharges just below the register 7 at 13, the other end being connected with an air pipe 14 which passes forwardly and which is provided with a mouth piece 15 or funnel just at the rear of the fan. A by-pass 16 is disposed around the casing 6 being connected at one end with the pipe 10 and at the other end with the pipe 8. At the junction of the by-pass 16 with the pipe 8 I locate a valve 17 which is controlled by a handle 18 that may project up through a slot in the floor 5. The valve 17 is arranged to control the flow of the products of combustion, that is to say, to turn them either through the by-pass 16 or into the casing 6. A locking segment 19 is provided for holding the valve in position.

From the foregoing description of the various parts of the device the operation thereof may be readily understood. When the engine is started and the valve handle 18 is in the full line position shown in Fig. 1 the products of combustion pass through the exhaust pipe 8 into the interior of the casing 6 surrounding the coil 12 and imparting to it the heat of the products of combustion. The products of combustion then pass through the pipe 10 and through the muffler into the outer atmosphere. The movement of the fan draws air in through the radiator 1 and forces it over the hot engine as in the ordinary manner. A portion of the air, however, is forced into the funnel 15 and thence rearwardly through the pipe 14 and through the coil 12 out through the opening 13 and past the register into the car. The hot products of combustion tend to bring the coil 12 to a high degree of temperature so that as the cooler air is forced into the pipe 14 it becomes heated before it passes up through the register 7. The occupants of the vehicle are therefore warmed by this heated air which passes up through the register. It will be noted that the products of combustion cannot pass up through the register but are delivered through the muffler in the ordinary manner. The pure fresh air, however, is heated by the heat from the products of combustion and is thereafter delivered through the register 7. When it is not desired to heat the car the handle 18 may be thrown back into the dotted line position shown in Fig. 1, thereby bringing the valve 17 into the dotted line position shown in Fig. 3, and thus causing the products of combustion to pass through the by-pass 16 and through the muffler. The coil 12 may then be used as a ventilator if desired, or if the occupants of the car wish to prevent the movement of air through the pipe 14 the gates 7ˣ of the register may be closed entirely.

The arrangement for heating the automobile is comparatively simple. It is at the same time economical because heat which would ordinarily be wasted is utilized. Moreover, the air which is heated is perfectly fresh, the obnoxious odors being carried out through the discharge pipe (not shown) at the rear of the muffler.

I claim:—

The combination with an automobile having an engine and a fan, of a casing disposed beneath the floor of the automobile, a register, a coil within said casing having its upper end terminating just beneath said register and being in communication with said register, a pipe for supplying the coil with fresh air, said pipe having a funnel disposed in close proximity to the fan into which the air from the fan is driven, an exhaust pipe communicating at one end with the exhaust manifold of the engine and at the other end with the interior of the casing on one side thereof, a discharge pipe leading from the other side of the casing, a by-pass around the casing communicating at one end with the exhaust pipe and at the other end with the discharge pipe, a valve disposed at the junction of the by-pass with the exhaust pipe, a handle for operating said valve, and means for locking the handle in its shifted position, the movement of the valve serving to direct the products of combustion either through the casing or through the by-pass.

EDGAR RUTTLE.

Witnesses:
  GEORGE J. KILB,
  JOHN GUTHIER.